E. PASSBURG.
PROCESS OF DESICCATING MILK.
APPLICATION FILED OCT. 29, 1907.

1,049,141.

Patented Dec. 31, 1912.

2 SHEETS—SHEET 1.

WITNESSES:
Fannie Fisk
Henry J. Suhrbier

INVENTOR
Emil Passburg
BY Joomer Joome
ATTORNEYS.

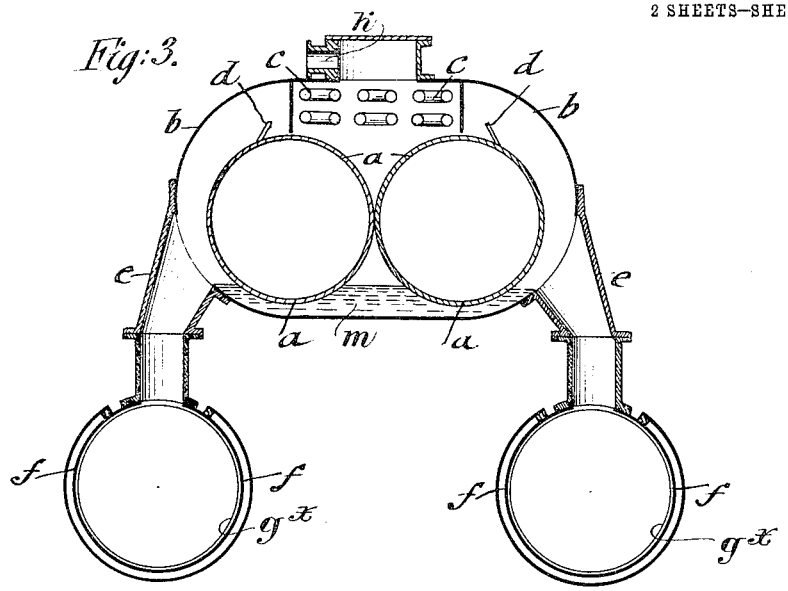
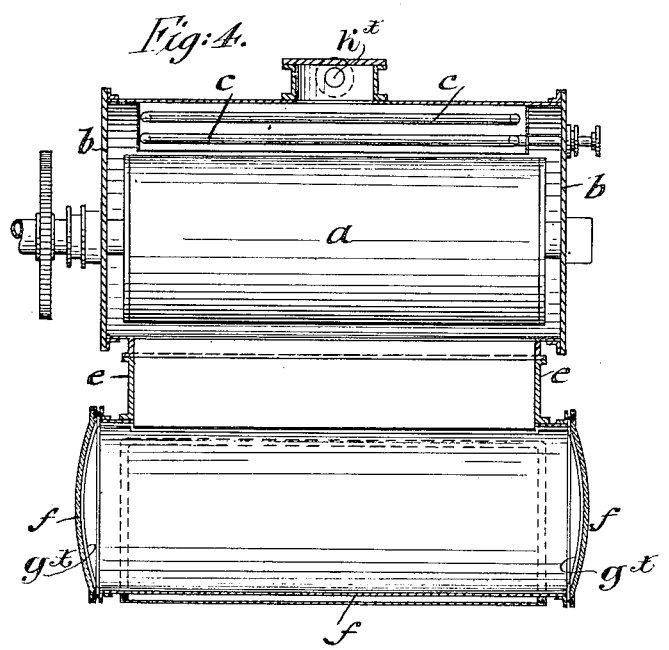

UNITED STATES PATENT OFFICE.

EMIL PASSBURG, OF BERLIN, GERMANY.

PROCESS OF DESICCATING MILK.

1,049,141.

Specification of Letters Patent.

Patented Dec. 31, 1912.

Application filed October 29, 1907. Serial No. 399,753.

*To all whom it may concern:*

Be it known that I, EMIL PASSBURG, a citizen of the Empire of Germany, residing in Berlin, in said Empire of Germany, have invented certain new and useful Improvements in Processes of Desiccating Milk, of which the following is a specification.

The object of this invention is to furnish a process by which a crude dry-milk of the best quality, and which is easily soluble in water, is obtained.

The improved process is based on the considerations: 1, that the difference of temperature between the boiling point under vacuo of the milk and the temperature of the heating drum has to be a large one, about 50° C. or more, for quickly carrying out the drying operation; 2, that in consequence of this large difference of temperature, the milk requires only to be exposed a very short time, of even less than a minute, to the heating influence of the drum, heated by steam to 100° C. or more, so that the milk-skin cannot receive from the drum a temperature (about 56–65°) at which the albuminous substances coagulate; 3, that under these conditions the milk should not dry entirely on the surface of the drying drum; and 4, that the dry-milk should not come into contact with the iron of conveyers and the like.

In the accompanying drawings are shown different means by which my improved process can be carried out, and in which—

Figure 1:
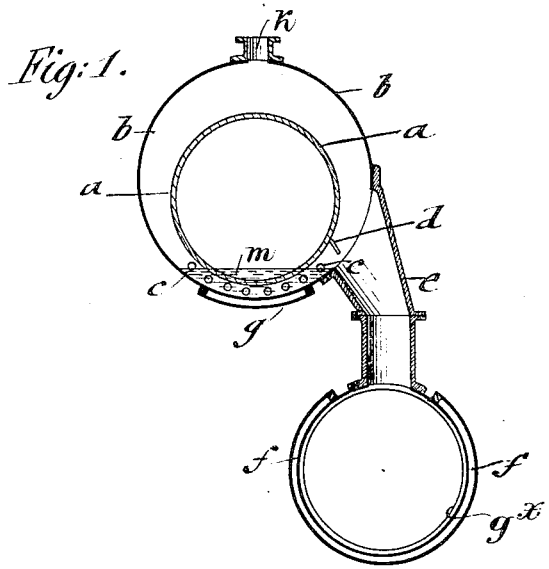
Figure 2:
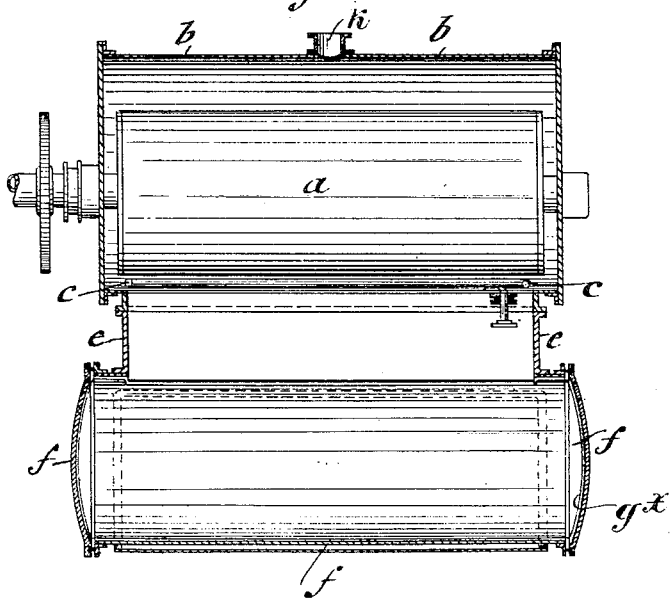

Figures 1 and 2 represent respectively a vertical transverse section and a vertical longitudinal section of one form of apparatus for making dry-milk, and Figs. 3 and 4 are similar sections of another form of the same.

Similar letters of reference indicate corresponding parts throughout the several figures of the drawings.

My improved process of making dry-milk takes place in the following manner: The milk is conducted in a continuous stream into the vacuum-cylinder $b$, Figs. 1 and 2, in which, in case crude dry-milk is to be produced, at least a vacuum has to be obtained that is high enough so that the boiling point of the milk is below the temperature at which the albuminous substances are coagulated. It is advisable, however, to use a still lower temperature and boil the water in the milk at about 40–50° C., or even at a still lower temperature, for the reason that thereby the difference between the temperature of the heating drum and the degree to which the milk is heated becomes greater, the productive capacity larger and the drying process quicker, all of which exerts a beneficial influence on the quality of the dry-milk.

Under some circumstances it is even advisable to subject the milk to a cooling operation in the vacuum-apparatus, for which purpose cooling-pipes $c$ or cooling-jackets $g$ may be arranged in or on the vacuum-apparatus $b$. The cooling devices are furthermore useful, and even necessary, for the reason that without the same, on the interruption of the vacuum in the apparatus at the close of the drying operation or during the removal of the dry-milk, the milk which is in contact with the heated drums, might be easily raised to the objectionable temperature of over 60° C. In this case it is necessary to introduce before the end of the drying operation cold water through the pipes respectively the cooling-jacket, so as to cool the milk, prevent the coagulation of the albuminous substances, and produce an easily soluble, crude dry-milk.

The drying drum $a$, which is heated by steam to about 100° C., is immersed in the milk $m$ which is in the lower part of the same and introduced therein through the openings $k$ (Figs. 1, and 2,) or the milk is conducted onto the double drying drum, shown in Figs. 3 and 4, from above, through the opening $k$ and forms in both cases a thin film on the heated surface of the drum so that notwithstanding the intimate contact of the milk with the surface heated to about 100° C., the evaporation takes place so intensely that the milk as long as it still has a comparatively small proportion of water and as long as still the required high vacuum is sustained, is not heated above the so-called dangerous temperature before mentioned. At each rotation of the drums, whose number of rotations is governed by their diameter, a steel-scraper $d$ removes the layer of milk, which is still somewhat moist and therefore soft, so as to be conducted in the form of a skin into the open receiver $e$, $f$, which is capable of being heated. After the receiver is filled with skin-milk, the operation is interrupted and the mass removed from the receiver, after which it is subjected to further drying. The dry-milk, which has a tubular appearance owing to its scraped and rolled up condition, is then comminuted outside of the drying apparatus by means of separators, screens or brushing machines into small, uniform scales.

The receiver $f$ can be heated, on the one hand, so as to prevent the scraped off skin of milk from taking up again moisture from the vapors of the milk heated on the surface of the drum, and, on the other hand, so as to permit slight subsequent drying of the skin. The receiver is provided with a non-metallic lining $g^x$ so that the milk is prevented from coming into any direct contact with heated iron walls.

In case it should be advisable for some reason or other to sterilize, that is to say, boil the fresh-milk before it is subjected to the drying operation, even then the use of the hereinbefore described process has considerable advantages as compared to the drying processes in which the milk is dried at a temperature of about 100° C. on the heating drums, as by the latter the destruction or impairment of the quality of the nutritious parts, and especially of the fatty parts, cannot be obviated, while according to the present process all the nutritious substances which are contained in the fresh-milk are retained unimpaired in the dry-milk.

Mixtures of dry-milk with cocoa, malt-extracts, coffee, or other substances can be dried by my improved process with the same advantages.

Having thus described my invention, I claim as new and desire to secure by Letters Patent:—

The process herein described of desiccating milk, which consists in depositing the milk in a layer on a drying surface heated to about 100° C. or more, subjecting the milk so deposited to the action of a vacuum sufficiently high to maintain the boiling point of the milk below the temperature at which the albuminous substances would coagulate, scraping off the milk skin from the drying surface before the same is entirely dried and before the last named temperature is reached, and finally expelling any additional moisture from the milk skin so scraped off without removing it from the vacuum by slowly heating it in contact with a bad heat conducting material.

In testimony, that I claim the foregoing as my invention, I have signed my name in presence of two subscribing witnesses.

EMIL PASSBURG.

Witnesses:
 WOLDEMAR HAUPT,
 HENRY HASPER.